US006354161B1

(12) United States Patent
Patel et al.

(10) Patent No.: US 6,354,161 B1
(45) Date of Patent: Mar. 12, 2002

(54) SPRING POWERED SWITCH AND METHOD AND APPARATUS FOR TESTING THE SAME

(75) Inventors: Nagar J. Patel, Pittsburgh; John J. Hoegle, Beaver; Edward J. Klimek, Jeanette, all of PA (US); Truc T. T. Nguyen, Springfield, VA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/427,232

(22) Filed: Oct. 26, 1999

(51) Int. Cl.[7] .................................................. G01D 9/38
(52) U.S. Cl. ...................................................... 73/865.9
(58) Field of Search .............................. 73/865.9, 865.3

(56) References Cited

U.S. PATENT DOCUMENTS 3,183,599 A * 5/1965 Byrd et al. ................ 73/865.9
5,671,161 A * 9/1997 Bennet et al.
5,726,367 A 3/1998 Patel et al. ................ 73/865.9

OTHER PUBLICATIONS

Berger et al., "Maintenance–Free Vacuum Circuit–Breaker", The Reliability of Transmission and Distribution Equipment, IEEE Conference Publication No. 406, 6 pp., Mar. 29–31, 1995.

N. Anger et al., "Diagnostics/Monitoring for Medium–Voltage Components and Systems", pp. 1.14.1–1.14.4, No Date.

* cited by examiner

*Primary Examiner*—Robert Raevis
(74) *Attorney, Agent, or Firm*—Martin J. Moran

(57) ABSTRACT

Operation of a medium voltage spring powered circuit breaker having an operating mechanism is analyzed by a test unit. The test unit includes a potentiometer having an input and a rotary shaft. A voltage source energizes the input of the potentiometer. A rotary wheel engages a driven part, such as a spring crank or a closing cam, of the operating mechanism to adjust the rotary shaft of the potentiometer and produce a variable output voltage thereof. The potentiometer tracks angular movement of the driven part and the output voltage corresponds to the variable angular movement of the driven part. A processing unit or an oscilloscope monitors the output voltage with respect to time in order to monitor the angular movement of the driven part with respect to time.

23 Claims, 8 Drawing Sheets

SPRING POWERED SWITCH AND METHOD AND APPARATUS FOR TESTING THE SAME

CROSS REFERENCE TO RELATED APPLICATION

This application is related to commonly assigned, copending application Ser. No. 09/267,525, filed Mar. 12, 1999, entitled "Method and Apparatus for Testing Spring Powered Switches" by Benke et al.

BACKGROUND OF THE INVENTION

1. Field of the Invention

This invention relates to spring powered switches, and to testing of the mechanical operation of spring powered switches such as medium voltage circuit breakers.

2. Background Information

Switches carrying sizable electric currents, such as medium voltage circuit breakers, require substantial mechanical forces to operate the switch rapidly and to hold the contacts closed against the magnetic repulsion forces generated by the current. In a typical medium voltage circuit breaker, a set of charged closing springs is released to close the breaker and to charge an opening spring which, in turn, is later released to open the breaker. The speed at which the mechanism operates is so rapid that it is difficult to identify the nature of any malfunctions, or even in some cases, to discern that the breaker is not operating properly.

Under typical practice, a skilled engineer is dispatched to the field or the circuit breaker must be returned to the factory to determine the cause and remedy for a malfunction or impaired performance. Due to the high inertia developed in the operating mechanism, there is considerable overshoot and distortion of the parts during operation. Often, analysis, which typically is performed using an expensive camera system, is qualitative rather than quantitative (e.g., it is determined that there is excessive overshoot, but no measurement of the amount of overshoot is provided). This technique for analyzing the operation of such switches is expensive and time consuming, and is highly dependent upon the skill and experience of the tester.

U.S. Pat. No. 5,726,367 discloses a method and apparatus for testing the operation of a spring powered switch mounted in a support frame and operated by an operating mechanism having driven parts actuated by release of charged springs. A recording medium, such as a tape, is applied to one of the driven parts. A fixture mounted to the support frame adjacent the selected driven part supports a marking instrument in contact with the recording medium at a fixed point relative to the support frame. When the charged spring is released, the selected driven part, which carries the recording medium, moves relative to the marking instrument. This produces a trace on the recording medium representing the movement of the selected driven part relative to the fixed point. This trace provides a quantitative record of the movement of the selected driven part which can be used to analyze the performance of the operating mechanism of the switch.

N. Anger et al., "Diagnostics/Monitoring for Medium-Voltage Components and Systems", pp. 1.14.1–1.14.4, discloses the detection of the angle of rotation curve for the breaker shaft of a vacuum circuit breaker's spring-stored-energy operating mechanism. An expert circuit breaker diagnostic system employs temperature sensors, current transformers, and an angle resolver to provide temperatures, opening and closing solenoid coil currents and charging motor currents, and shaft angles to a microprocessor in a continuous on-line operation. Trend analyses are performed using parameters of individual past switching operations with the aid of temperature, voltage and time-compensated classification models.

Although it is known to employ mechanical or electronic sensors for sensing movement of certain operating mechanism components to test a circuit breaker, there remains a need, however, for an improved method and apparatus for ready and inexpensive testing of spring operated switches.

SUMMARY OF THE INVENTION

This need and others are satisfied by the invention which is directed to a spring powered switch. The switch is operated by an operating mechanism including a driven part having a variable angular position. A rotary potentiometer tracks the variable angular movement of the driven part. The output signal of the potentiometer corresponds to the driven part's variable angular movement. The output signal is monitored with respect to time in order to monitor the angular movement of the driven part with respect to time.

As one aspect of the invention, a method of testing a spring powered switch comprises the steps of selecting one of a plurality of driven parts actuated by release of a charged spring; releasing the charged spring to actuate the driven parts and produce angular movement of the selected one of the driven parts; energizing a rotary potentiometer; tracking angular movement of the selected one of the driven parts with the rotary potentiometer to produce a variable output signal therefrom which corresponds to the angular movement; and monitoring the output signal with respect to time in order to monitor the angular movement of the selected one of the driven parts with respect to time.

As a preferred refinement, an eccentric surface is employed on the selected one of the driven parts; the eccentric surface is followed with a wheel; the wheel is employed to monitor angular movement of the selected one of the driven parts; and the potentiometer is adjusted with the wheel.

As another aspect of the invention, an apparatus for testing a spring powered switch including a driven part having a variable angular position comprises a potentiometer having an input and a rotary shaft; means for energizing the input of the potentiometer; means for engaging the driven part to adjust the rotary shaft of the potentiometer and produce a variable output signal therefrom which corresponds to variable angular movement of the driven part; and means for monitoring the output signal with respect to time in order to monitor the angular movement of the driven part with respect to time.

As a preferred refinement, the spring powered switch includes a support member adjacent the driven part, the driven part has an eccentric surface, and the means for engaging the driven part includes: a wheel being in rotational contact with the eccentric surface of the driven part; and means for rotatably supporting the wheel with respect to the support member and for following the eccentric surface with the wheel. An axle of the wheel rotates in response to the variable angular position of the driven part.

As a further aspect of the invention, a spring powered switch comprises separable contacts having an open position and a closed position; means for operating the separable contacts between the open and closed positions; and a test assembly. The means for operating includes a driven part having a plurality of angular positions and a closing spring for actuating the means for operating to move the driven part between the angular positions. The test assembly comprises a potentiometer having an input and a rotary shaft; a voltage source connected to the input of the potentiometer; means for engaging the driven part having a linkage which rotates in response to the variable angular position of the driven part; and means for monitoring the output voltage with respect to time in order to monitor the angular movement of the driven part with respect to time. The linkage engages the rotary shaft of the potentiometer to adjust the potentiometer and produce a variable output voltage. The output voltage corresponds to the angular movement of the driven part.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
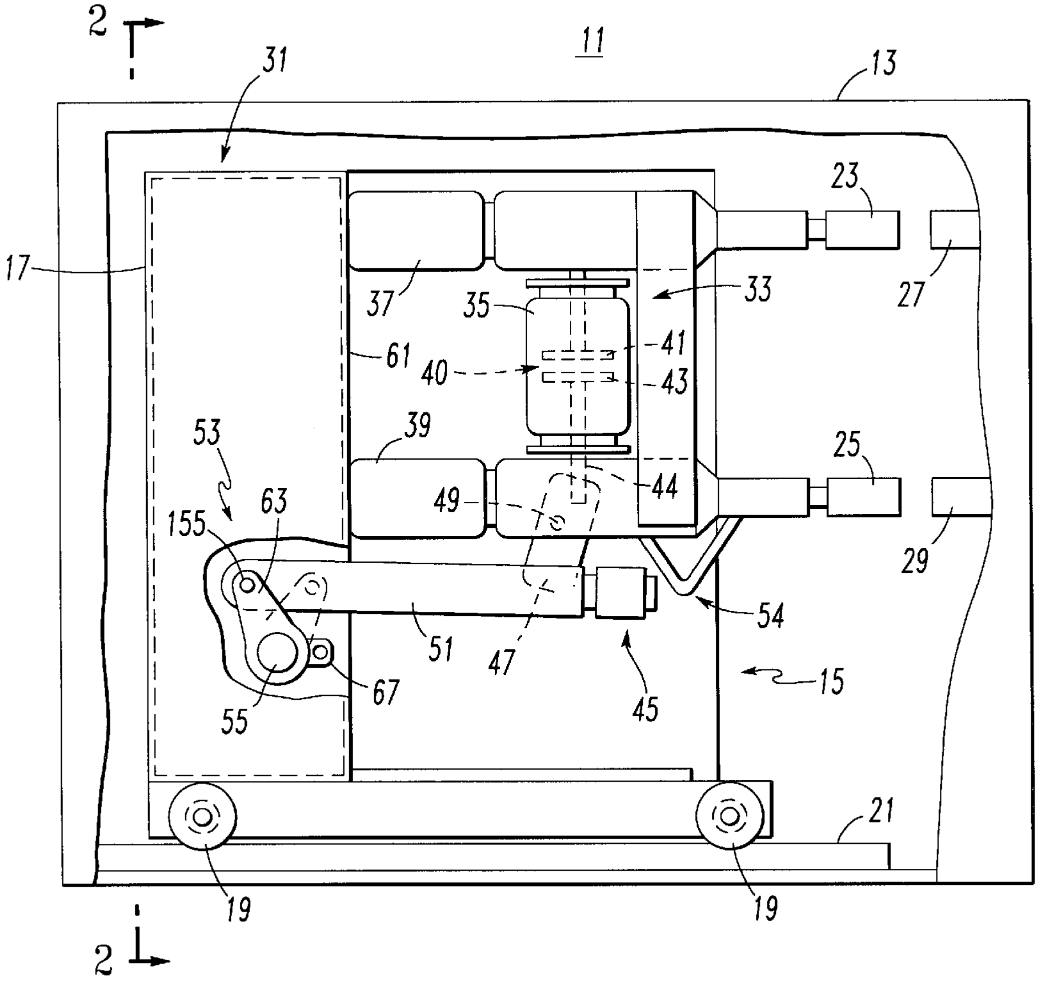
FIG. 1 PRIOR ART
FIG. 1 is a side elevational view, with some parts cut away, of a typical medium voltage circuit breaker shown in the disconnected position.
Figure 2:
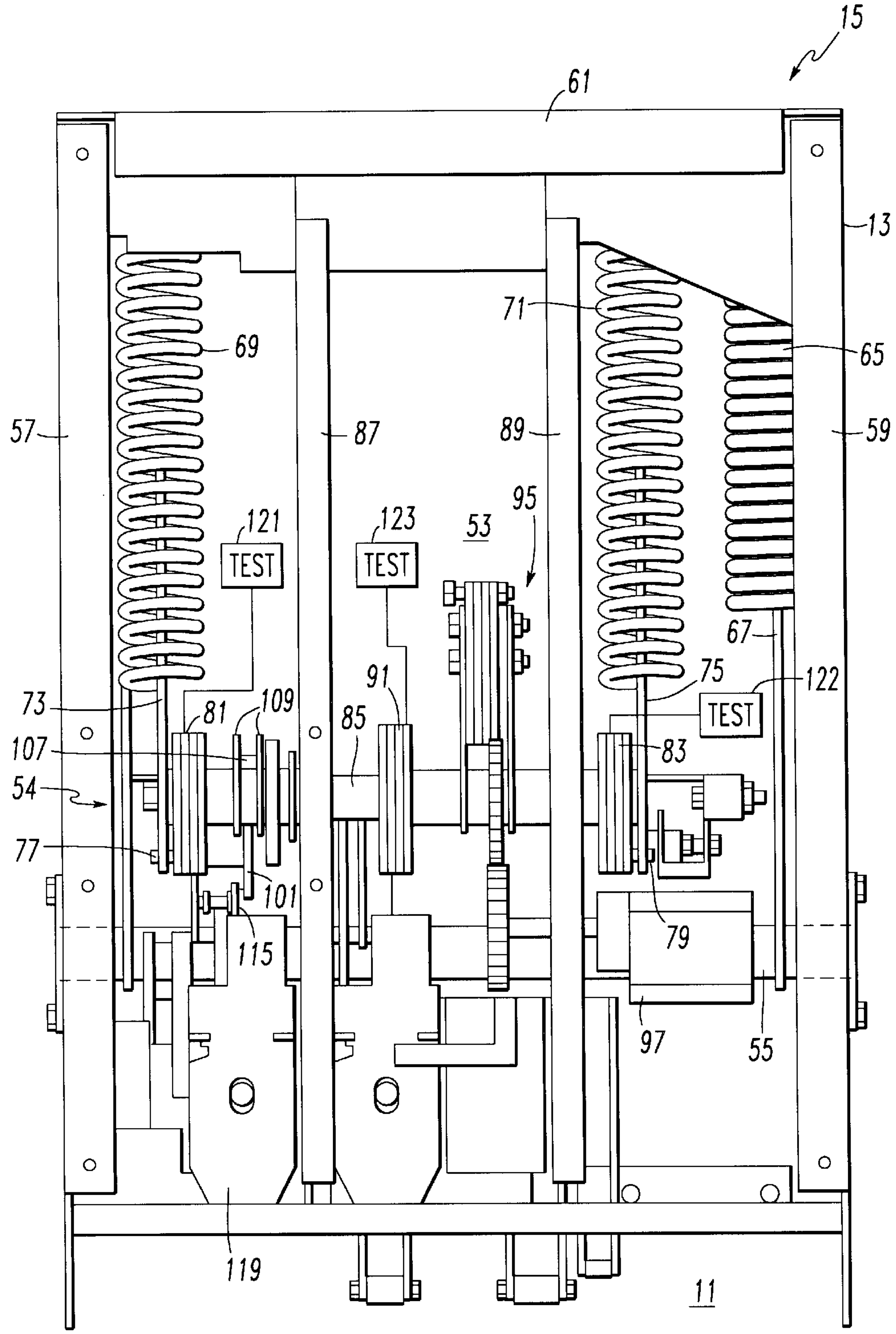
FIG. 2 is a front elevational view of a circuit breaker, similar to the circuit breaker of FIG. 1, with the cover removed, but having three test units, shown in block form, in accordance with the invention.

As shown in FIGS. 1 and 2, a metal-clad or metal-enclosed switch gear apparatus 11 includes a metal cabinet or enclosure 13 for enclosing a spring powered switch, such as the exemplary circuit breaker 15. Examples of the apparatus 11, enclosure 13, and circuit breaker 15 are disclosed in U.S. Pat. No. 5,726,367, which is incorporated by reference herein.

The exemplary circuit breaker 15 is preferably a draw-out three-phase vacuum circuit interrupter having controls on a front face 17 for manually operating the circuit breaker. The circuit breaker 15 has wheels 19 which engage rails 21 for inserting the circuit breaker into and removing it from the enclosure 13. Movement of the circuit breaker 15 along the rails 21 also effects connection and disconnection of terminals 23 and 25 on the circuit breaker with respective line and load terminals 27 and 29 mounted in the enclosure 13, in a well known manner.

The circuit breaker 15 has a front mechanism section 31 adjacent to the front panel 17 and a rear high voltage section 33 containing a vacuum interrupter 35 for each phase. The mechanism and high voltage sections 31,33 are electrically insulated from each other by upper and lower insulators 37 and 39, respectively. Within each vacuum interrupter 35, a pair of separable contacts 40 including a stationary contact 41 and a moveable contact 43 are provided. The contacts 40 are operated between the open position (shown in FIG. 1) and a closed position (not shown) by a linkage 45 which includes a bell crank 47 pivoted at 49 and an insulated push rod 51 extending into the mechanism section 31.

An operating mechanism 53 for opening and closing the separable contacts 40 through the linkage 45 is contained in the mechanism section 31. This operating mechanism 53 operates a number of driven parts 54 (as best shown in FIG. 2). A pole shaft 55 is rotatably journaled in side walls 57 and 59 of a frame or housing 61. A pole arm 63 (FIG. 1) for each phase projects laterally from the pole shaft 55 and is pivotally connected to the associated push rod 51 so that rotation of the pole shaft 55 counter-clockwise or clockwise (with respect to FIG. 1) simultaneously opens or closes, respectively, the separable contacts 40 of each pole. The pole shaft 55 is rotated counter-clockwise (with respect to FIG. 1) to open the contacts 40 by an opening spring 65 (FIG. 2) in the form of a helical tension spring connected at one end to an upper portion of the frame 61 of the mechanism section 31 and at the other end to a lever arm 67 mounted on the pole shaft 55.

The operating mechanism 53 also includes a pair of helical tension closing springs 69 and 71 (FIG. 2) each of which is connected at its upper end to the frame 61 and at its lower end through a spring link 73,75 to an eccentric pivot 77,79 on a spring crank 81,83, respectively. The spring cranks 81 and 83 are mounted on opposite ends of a cam shaft 85 rotatably supported between a pair of spaced supports 87 and 89. Fixed on the cam shaft 85 between the supports 87 and 89 is a closing cam 91 which includes a notch (not shown) in the peripheral cam surface thereof.

The cam shaft 85 is rotated to extend or charge the two closing springs 69 and 71 by a charging mechanism 95 engaging the cam shaft 85 between the closing cam 91 and the support 89. As is well known, this charging mechanism 95 includes an electric motor 97 which can be energized to rotate the cam shaft 85 through a ratchet (not shown). Alternatively, as is known, the cam shaft 85 can be manually rotated to charge the closing springs 69,71 by a charging lever (not shown) which engages the charging mechanism 95. The closing springs 69 and 71 are retained in the charged condition and released by a first, closing spring release (not shown) which includes a closing spring release latch 101 pivotally connected on a shaft (not shown). This closing spring release latch 101 has a latch surface (not shown) which is engaged by a close latch roller 107 supported between a pair of roller support arms 109 fixed to the cam shaft 85.

With the circuit breaker 15 open and the closing springs 69 and 71 discharged, operation of the charging mechanism 95 causes the cam shaft 85 to rotate. This causes the eccentric pivots 77,79 to move downward (with respect to FIG. 2) thereby extending the closing springs 69 and 71. Just after the eccentric pivots 77,79 carry the lines of action of the closing springs 69,71 through the center of the cam shaft 85, the closing latch roller 107 engages the latch surface (not shown) on the closing spring release latch 101. The tendency of the closing springs 69,71 to continue the rotation in this closing operation is blocked by the engagement of an extension (not shown) on the release latch 101 with a fixed pin (not shown).

The release latch 101 is operated by a release lever 115 pivotally connected at one end to an arm (not shown) on the pole shaft 55. The other end of the release lever 115 rests on a close clapper 119. The close clapper 119 in turn is pivotally supported on a bracket (not shown) which also supports a close solenoid (not shown). Rotation of the close clapper 119 about a pivot axis, either manually by pressing on the lower end of the clapper, or automatically by energization of the close solenoid, causes rotation of the release lever 115. The release lever 115 engages a projection (not shown) on the closing spring release latch 101 which is rotated until the close latch roller 107 slips off of the latch surface (not shown). This permits the closing springs 69 and 71 to rapidly rotate the cam shaft 85 and actuate the driven parts 54, including spring cranks 81,83 and closing cam 91, to produce angular movement between a plurality of variable angular positions and, thus, actuate the operating mechanism 53. In turn, this results in rotation of the pole shaft 55 to close the separable contacts 40 of the circuit breaker 15. The force generated by the two closing springs 69,71 is required as they not only operate the mechanism 53 to close the separable contacts 40, but, also, charge the opening spring 65.

As discussed, the separable contacts 40 must be rapidly opened and closed. The sizeable spring forces required to do this must be absorbed which results in considerable distortion of components of the operating mechanism 53. This combination of factors makes it difficult to observe and evaluate the operation of the circuit breaker 15. The present invention provides a quantitative evaluation of circuit breaker performance. As discussed below in connection with FIGS. 3–8, one or more test units 121,122,123 monitor the position of respective driven parts 81,83,91.

Figure 3:
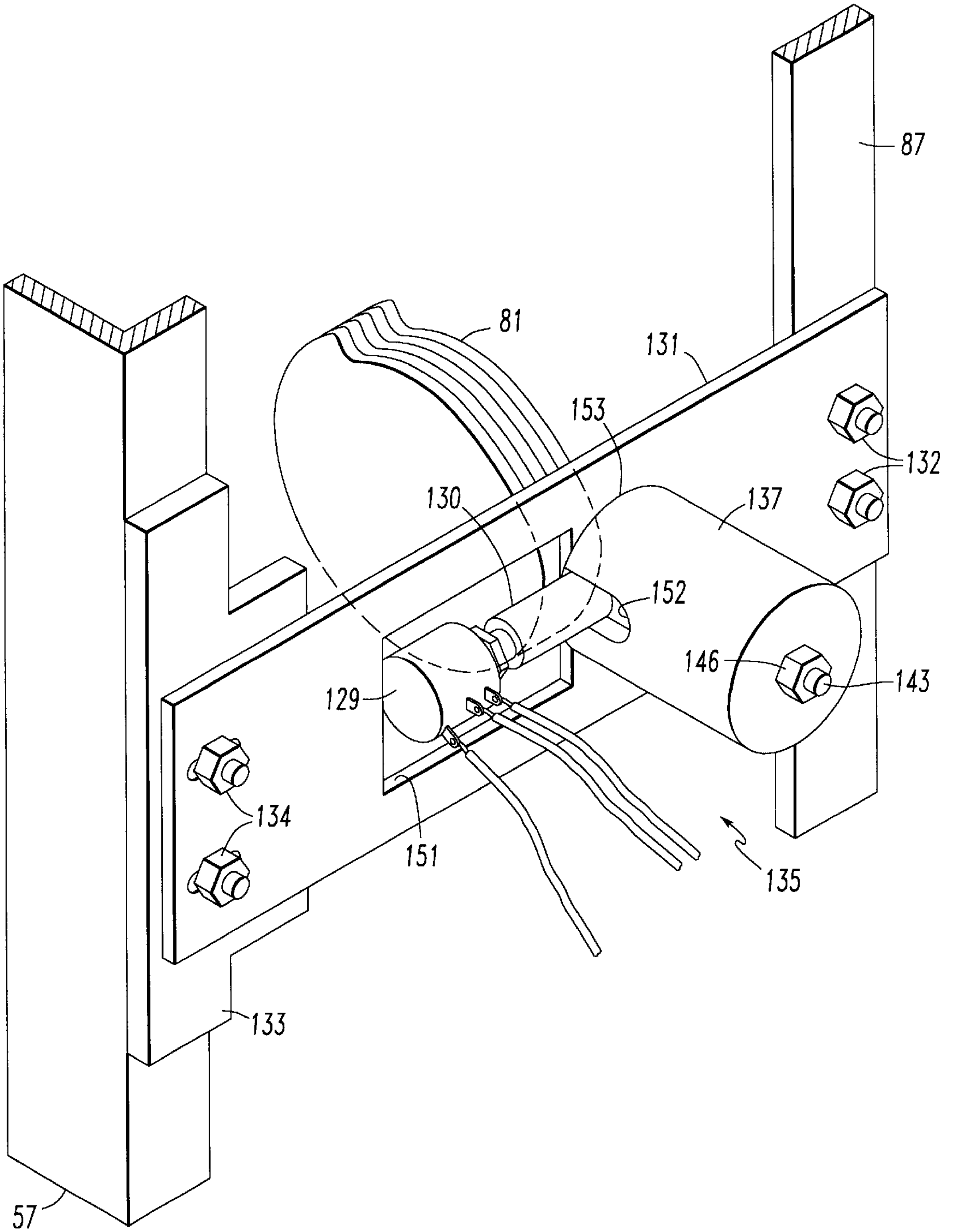
FIG. 3 is a front isometric view of one of the test units of FIG. 2.
Figure 4:
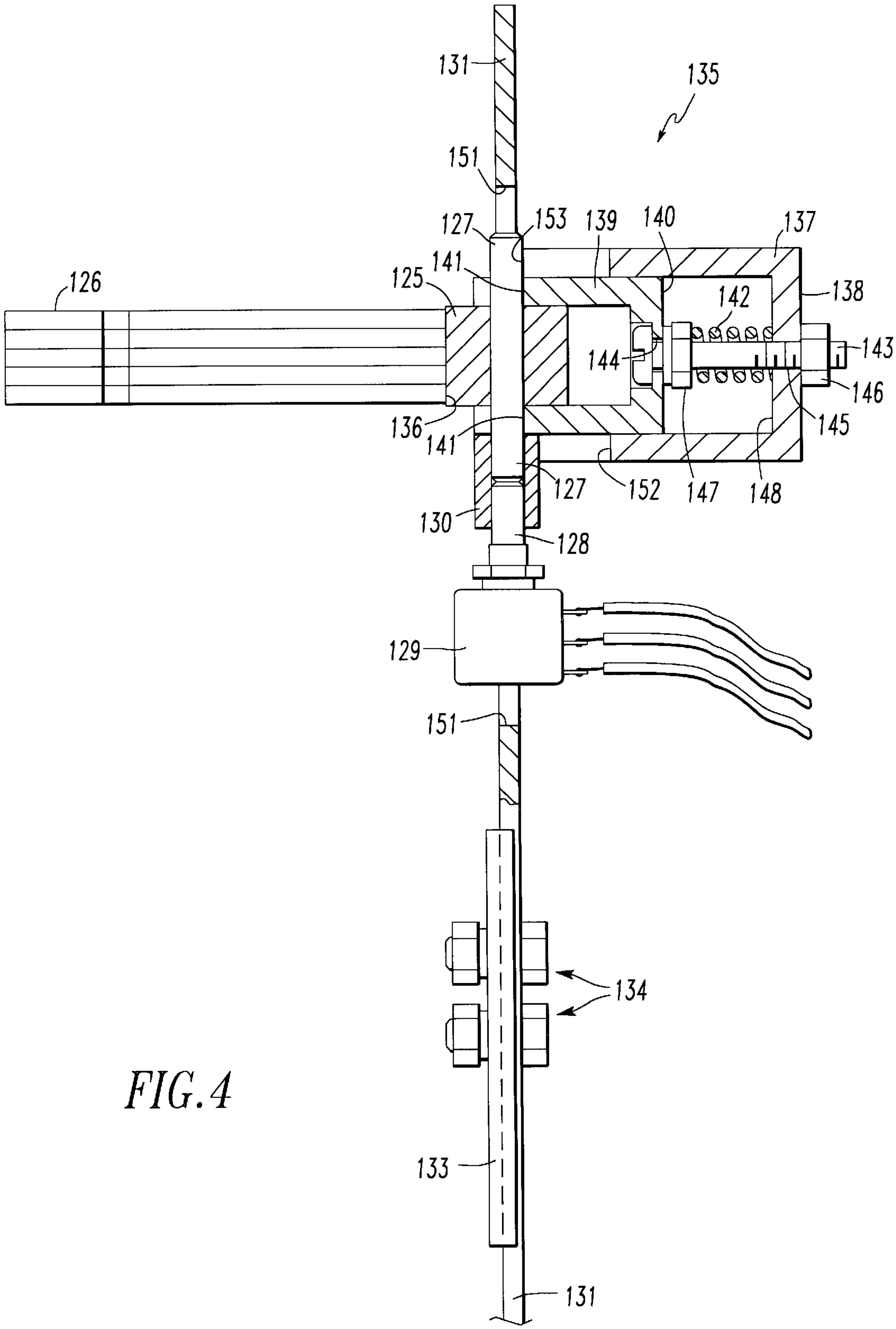
FIG. 4 is a top sectional view of the test unit of FIG. 3 along lines 4—4.
Figure 5:
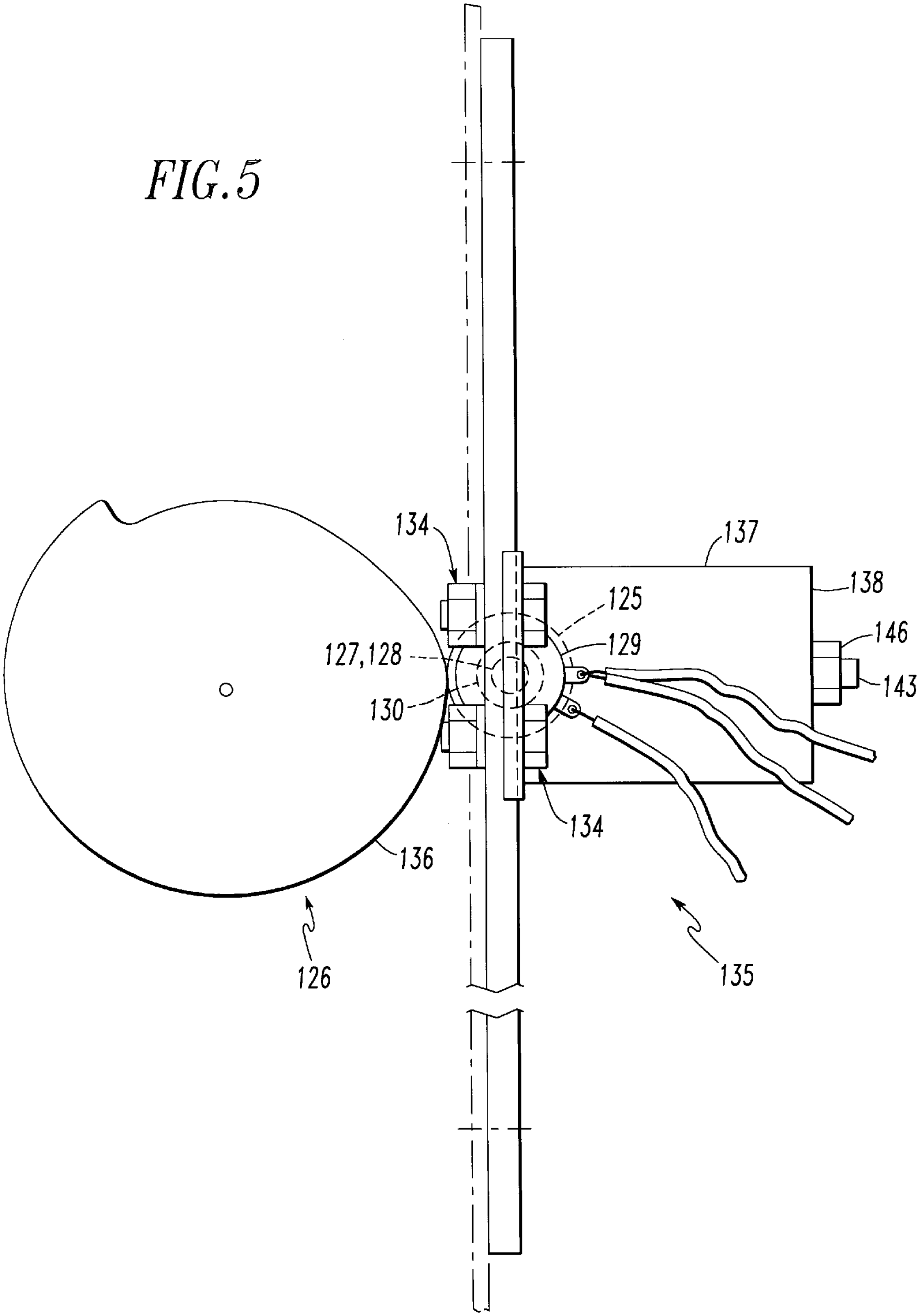
FIG. 5 is a side view of the test unit of FIG. 4.

Referring to FIGS. 3–5, a suitable sensor for the test units 121,122,123 of FIG. 2 is illustrated. During closing, the charged closing springs 69,71 are released, and the closing spring cranks 81,83 and closing cam 91 rotate clockwise (with respect to FIG. 1). As shown in FIGS. 4 and 5, a rotary member, such as wheel 125, which is preferably made from hard polyurethane rubber, engages and follows driven part 126 and, thus, the wheel 125 rotates in the opposite counterclockwise direction. The wheel 125 has a linkage, such as an axle or shaft 127, and is connected to the rotary shaft 128 of a potentiometer 129 by a coupler 130.

FIG. 3 illustrates a support member 131 for one of the test units 121–123 of FIG. 2. The support member 131 is mounted adjacent one of the driven parts 54, such as the closing spring crank 81. In the exemplary embodiment, the support member 131 is fastened by fasteners 132 to the vertical support 87 (FIG. 2) at one end, and is fastened to a mounting bracket 133 and to the side wall 57 by fasteners 134 at the other end.

As best shown in FIGS. 4 and 5, a support assembly 135 rotatably supports the wheel 125 in rotational contact with the selected driven part 126. As shown in FIG. 5, the driven part 126, such as the closing spring crank 81, preferably has an eccentric surface 136. Although an exemplary eccentric surface 136 is shown, the driven part 126 may employ other surfaces, such as a circular surface. In turn, the wheel 125 follows the eccentric surface 136 and is employed to monitor angular movement of the driven part 126, with the axle 127 of the wheel 125 rotating in response to the variable angular position of the driven part 126.

The support assembly 135 of FIG. 4 includes an outer tube 137 having a generally closed end 138, and an inner tube 139 having a generally closed end 140 and a pair of openings 141 near the opposite open end. The axle 127 of the wheel 125 passes through the openings 141 of the inner tube 139 which, thus, rotatably supports the axle 127 to permit rotation of the wheel 125. The inner tube 139 is received within the outer tube 137 and is biased away from the end 138 by compressed spring 142. In turn, the wheel 125 is biased against the eccentric surface 136. The spring 142 is disposed about the shaft of a screw 143 which passes through openings 144,145 in the ends of the respective inner and outer tubes 139,137. The compression of the spring 142 is suitably adjusted by hex nut 146 and jam nut 147 to accommodate variations in the eccentric surface 136, with the spring 142 being compressed between the jam nut 147 and the inside surface 148 of the end 138 of the outer tube 137.

As shown in FIGS. 3 and 4, the potentiometer 129 passes through and freely moves within an opening 151 of the support member 131. Also, the shaft 127 of the wheel 125 and the coupler 130 pass through and freely move within both the opening 151 and an opening 152 of the outer tube 137. In this manner, the potentiometer rotary shaft 128 freely rotates within the opening 151; the wheel shaft 127 and coupler 130 freely rotate within the openings 151,152; and the wheel 125, potentiometer 129 and coupler 130 freely move normal to the support member 131 and normal to the axis of the driven part 126, thereby following the eccentric surface 136 thereof. The open end 153 of the outer tube 137 is suitably secured (e.g., by socket head cap screws, not shown) to the support member 131 in order that the wheel 125 is rotatably supported by the inner tube 139 and, also, engages the driven part 126 with suitable force from the spring 142.

Figure 6:
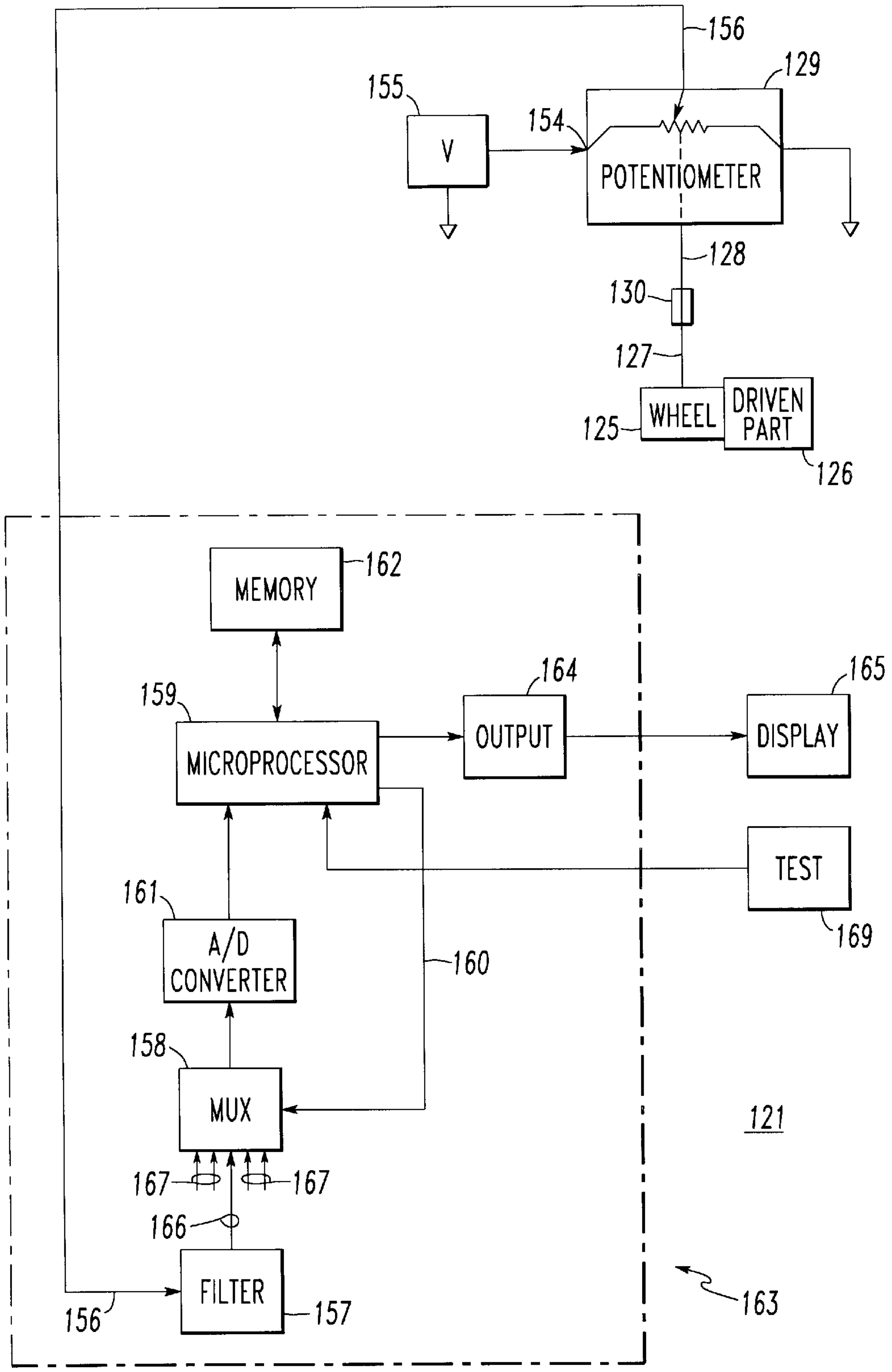
FIG. 6 is a block diagram of one of the test units of FIG. 2.

Referring to FIG. 6, a block diagram of one of the test units 121,122,123 of FIG. 1 is illustrated. As discussed above in connection with FIGS. 3–5, the wheel 125 engages the driven part 126. The rotary potentiometer 129, in turn, tracks the variable angular movement of the driven part 126 through the axle 127 of the wheel 125. The potentiometer 129 has an input 154, which receives a voltage output by a suitable voltage source 155, and an output signal 156. The voltage of the signal 156 corresponds to the angular movement of the rotary shaft 128 and, thus, the potentiometer 129 tracks the variable angular movement of the driven part 126.

During normal operation, the present position of driven part 126 is indicated by the output signal 156 of the potentiometer 129. The potentiometer output signal 156 is received by a filter 157 which filters and passes the signal to a multiplexer (MUX) 158. The MUX 158 selects one input from a plurality of inputs, in this case the signal output by the filter 157, according to a signal given by a microprocessor 159 via line 160. The MUX 158 passes the signal to an analog-to-digital (A/D) converter 161, which digitizes the signal and passes it to the microprocessor 159 for storage in memory 162.

It will also be appreciated that a wide range of mounting and interface mechanisms (e.g., bracket mounted, switch mounted, fastened, attached, glued, magnetically mounted, and non-interface mounted) may be employed for deploying the test units 121,122,123 with the circuit breaker 15. The test unit 123 of FIG. 1 also employs a potentiometer (not shown) to engage a linkage (not shown) to determine the angular position of the closing cam 91 of FIG. 1.

The microprocessor 159 of processing unit 163 collects operation data for the operating mechanism 53 of FIG. 2 when either the charged springs 69,71 are released or the operating mechanism is tripped to actuate the driven parts 54,126 and produce rotational movement thereof. Preferably, the signal 156 is monitored with respect to time in order to monitor the angular movement of the selected one of the driven parts 126 with respect to time. Thus, the operation data includes a plurality of the rotational positions of the driven parts 126 as read by the microprocessor 159 from the A/D converter 161. In turn, the microprocessor 159 outputs the operation data through the output interface 164 for display 165. The MUX 158 preferably includes a plurality of inputs 166,167 to receive the signal 156 as well as other inputs from other driven parts, such as 54 of FIG. 2.

Part of the electrical/mechanical testing of the exemplary circuit breaker 15 is the verification of performance. The method and apparatus of the invention accomplish this verification of performance. Preferably, a wide range of aspects of the performance of each circuit breaker 15 are individually verified. The processing unit 163 automatically collects the operation data while the exemplary circuit breaker 15 is operating. This operation data may then be employed to monitor the efficacy of the circuit breaker 15 operation.

By engaging the selected driven part 126 with the wheel 125, angular movement of the wheel 125 is produced which corresponds to angular movement of the selected driven part 126. In turn, the suitably constant voltage source 155 and the rotary shaft 128 of the potentiometer 129 produce the variable output signal 156 which corresponds to the variable angular movement of the driven part 126.

The potentiometer 129 of the test unit 121 of FIG. 6 is employed to determine voltage (V), which is proportional to rotational displacement (D), and, thus, displacement in terms of open and closed positions, and action in terms of action time, velocity, and acceleration. For example, the motion of the spring crank 81,83 (FIG. 2) is monitored to determine the speed of discharge of closing springs 69,71. While the cam shaft 85 typically has a relatively small diameter (e.g., in the exemplary embodiment, about 1"), the spring crank 81,83 typically has a relatively larger diameter (e.g., in the exemplary embodiment, about 3").

The motion of the closing cam 91 is monitored directly by employing the test unit 123 or, else, indirectly by employing the test units 121,122 for the spring cranks 81,83. The closing cam motion is determined by the motion of several parts including the cam shaft 85, vacuum interrupter 35 (FIG. 1), push rod assembly 51, pole shaft 55, opening spring 65, and closing springs 69,71. This motion, in turn, is broken down into: travel distance, open and closed positions, action time, action speed or velocity, and action acceleration.

Figure 7:
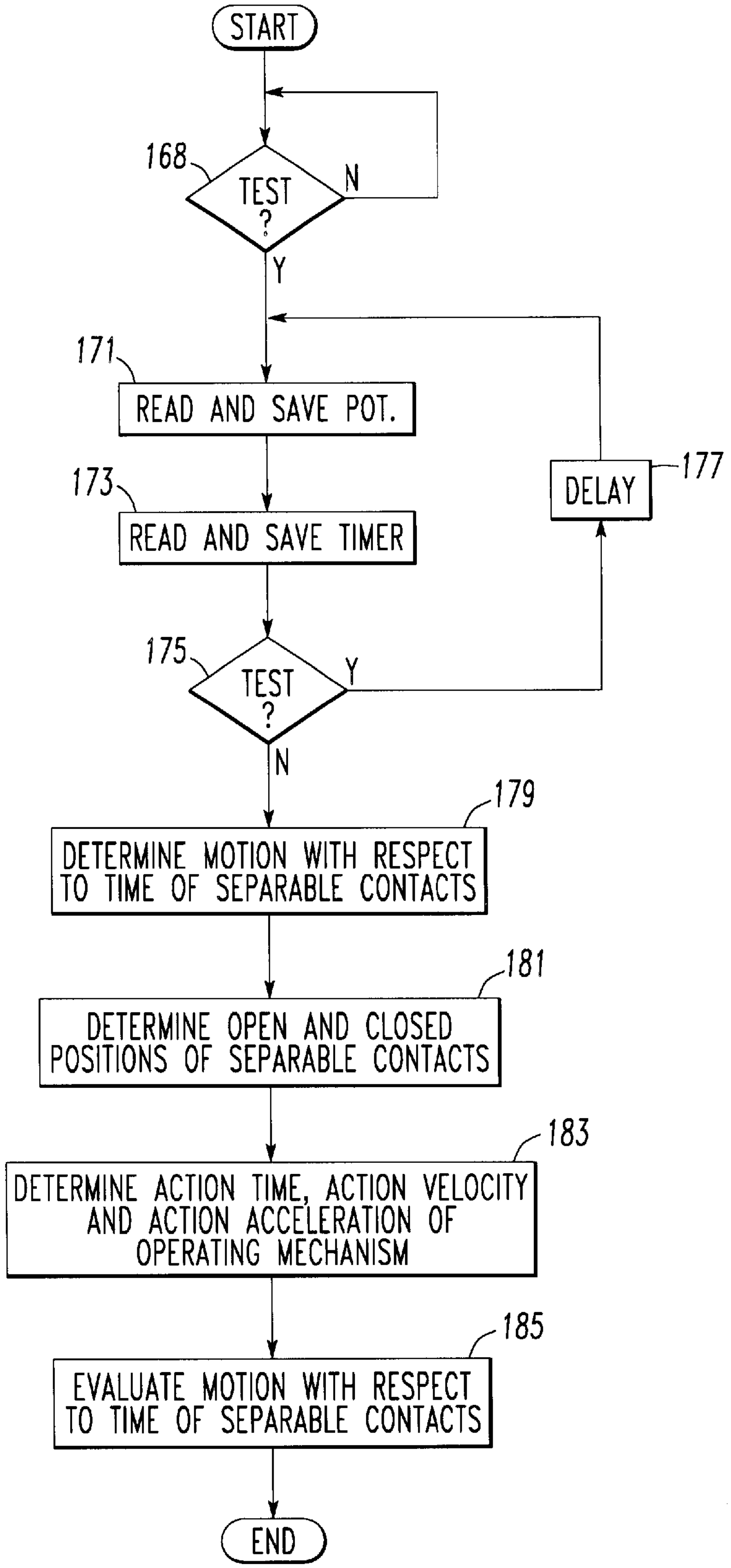
FIG. 7 is a firmware flow chart for the microprocessor of FIG. 6.

Referring to FIG. 7, a firmware flow chart for the microprocessor 159 of FIG. 6 is illustrated. At 168, if a test signal 169 is active, then the separable contacts 40 are to be closed by the operating mechanism 53. At 171, the microprocessor 159 determines the present position of the driven part, such as driven parts 54 of FIG. 2 or driven part 126 of FIG. 6, by reading the potentiometer output signal 156 (as discussed above in connection with FIG. 6) and saving the value in memory 162. At 173, the microprocessor 159 determines the present time by reading a microprocessor timer (not shown) and saving the value in memory 162. Next, at 175, if the test signal 169 is still active, then after a suitable delay, at 177, further sampling is conducted at 171 and 173. Steps 171, 173, 175 and 177 permit the microprocessor 159 to monitor motion with respect to time of the driven part and to, thereby, provide the operation data for the operating mechanism 53.

Otherwise, at 179, if the test signal 169 is not active, then the sampling period is complete and the microprocessor 159 determines motion with respect to time of the separable contacts 40 from the motion with respect to time of the driven part (e.g., by employing suitable calculations based upon the configuration of the operating mechanism 53, look-up tables, historical data). For example, the angular movement of the selected driven part with respect to time is known from the stored digital values in memory 162. By monitoring and recording travel with respect to time of the spring crank 81,83 and/or the closing cam 91, the speed of discharge of the charged springs 69,71 and the opening and closing positions of the separable contacts 40 may readily be determined therefrom. The motion of the charged springs 69,71 is relatively difficult to directly measure, while the motion of the spring cranks 81,83 and/or the closing cam 91 is relatively easy to measure with the exemplary test units 121,122,123.

Next, at 181, based upon the initial and final positions of the separable contacts 40 from step 179, the open position and closed position of the separable contacts 40 is determined. At 183, action time, action velocity, and action acceleration of the operating mechanism 53 is determined from the motion with respect to time of the driven part. Finally, at 185, motion with respect to time of the separable contacts 40 is evaluated and the operation data is output through the output interface 164.

Figure 8:
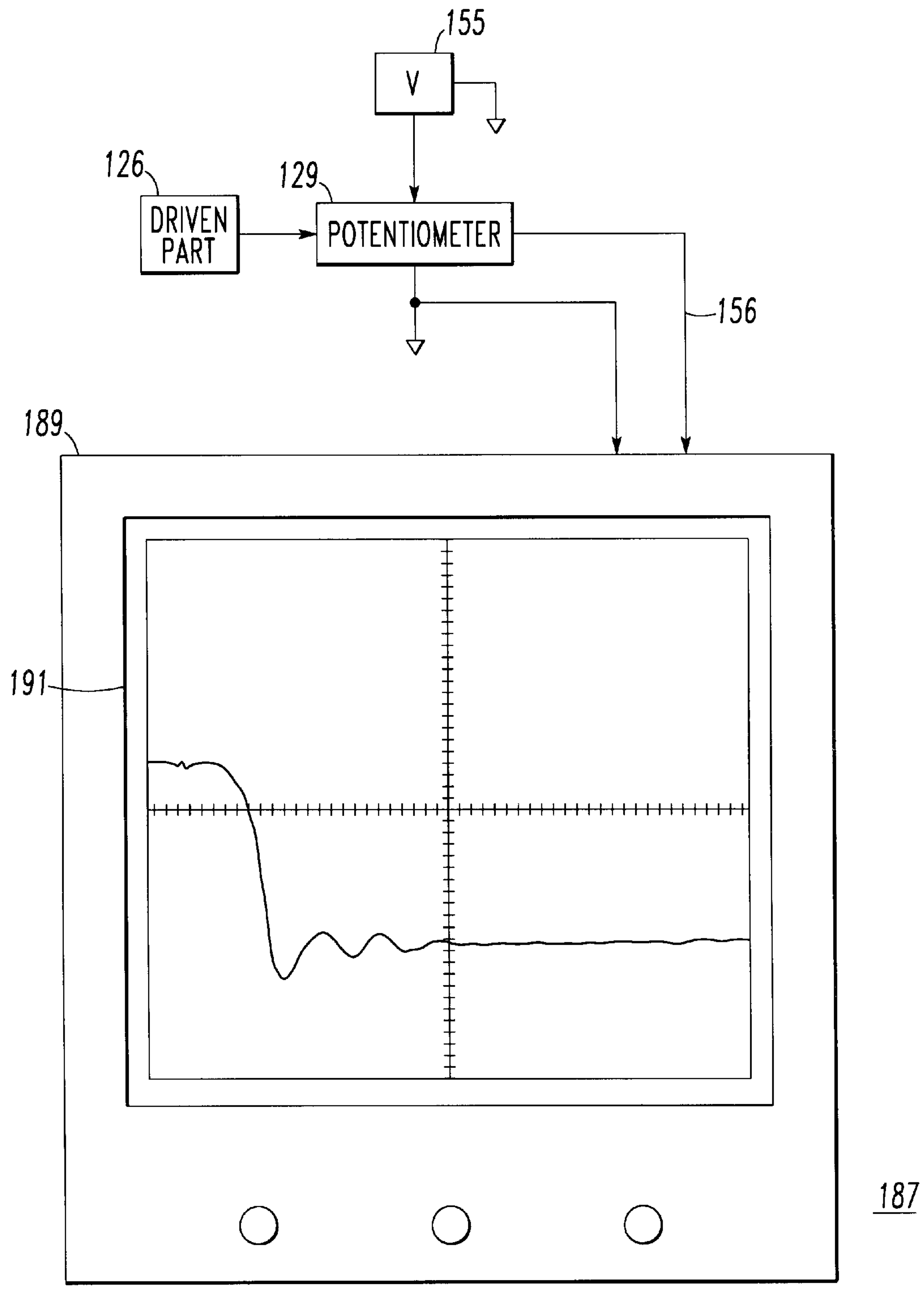
FIG. 8 is a block diagram of a test unit in accordance with another embodiment of the invention.

FIG. 8 is a block diagram of another test unit 187. The output voltage 156 from the potentiometer 129 of FIG. 4 is input by an oscilloscope 189. In turn, the oscilloscope 189 is employed to monitor the output voltage 156 with respect to time. The oscilloscope 189 has an output, such as display 191, for displaying the output voltage with respect to time.

Although a medium voltage vacuum interrupter 15 is disclosed as an exemplary embodiment of the invention, it will be appreciated that the teachings of the invention are applicable to other electrical switching devices such as, for example, other switching devices, fuse switches, other circuit breakers (e.g., air circuit breakers, miniature circuit breakers, and other mechanism devices).

The invention allows for automatic, hands-free, electronic collection of operation data. The improved method and apparatus provides operation data, as a record of the operation of the circuit breaker 15, which may be automatically stored and retrieved, manipulated, computer modified, or combined with other data. The operation data, in turn, may be easily read and maintained at the circuit breaker 15 and/or transported for remote analysis and/or storage.

While for clarity of disclosure reference has been made herein to the output interface 164 for output and display 165 of operation data, and to the oscilloscope 189 and display 191, it will be appreciated that the operation data may be stored, printed on hard copy, charted, plotted, graphed, manipulated, computer modified, or combined with other data. All such processing shall be deemed to fall within the terms “output” or “outputting” as employed herein.

In the exemplary embodiment, the operation data is stored in the memory 162 of microprocessor 159 as digital values corresponding to a suitable time reference. In this manner, the operation data may be readily transformed into charts, plots or graphs. Preferably, the operation data pertains to a wide variety of aspects of the performance of the exemplary circuit breaker 15 and may be accessed in a user friendly manner.

In this manner, the electrical signature of the circuit breaker closing mechanism is recorded. This electrical signature may be employed to monitor performance margin and diagnose potential problems. The travel record of the driven part, such as the closing spring crank, may be employed to analyze the closing mechanism characteristic of the circuit breaker.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of testing a spring powered switch operated by an operating mechanism having a plurality of driven parts actuated by release of a charged spring, said method comprising the steps of:

selecting one of said driven parts having a variable angular position;

releasing said charged spring to actuate said driven parts and produce angular movement of said selected one of said driven parts;

energizing a rotary potentiometer;

tracking angular movement of said selected one of said driven parts with said rotary potentiometer to produce a variable output signal therefrom which corresponds to said angular movement; and monitoring said output signal with respect to time in order to monitor said angular movement of said selected one of said driven parts with respect to time.

2. The method of claim 1 including:

employing said output signal with respect to time to determine a plurality of angular positions of said selected one of said driven parts;

determining operation data for said operating mechanism from said angular positions of said selected one of said driven parts; and outputting said operation data.

3. The method of claim 1 including:

energizing said rotary potentiometer with a voltage to produce a variable output voltage as the output signal;

employing an analog to digital converter to convert the output voltage to a plurality of digital values with respect to time; and employing a microprocessor to monitor said digital values with respect to time.

4. The method of claim 3 including:

storing said digital values with respect to time; and determining said angular movement of said selected one of said driven parts with respect to time from said stored digital values.

5. The method of claim 1 including:

energizing said rotary potentiometer with a voltage to produce a variable output voltage as the output signal; and employing an oscilloscope to monitor the output voltage with respect to time.

6. The method of claim 5 including:

displaying the output voltage with respect to time.

7. The method of claim 1 including:

rotatably supporting a rotary member in rotational contact with said selected one of said driven parts to produce angular movement thereof which corresponds to said angular movement of said selected one of said driven parts; and adjusting said potentiometer with said rotary member.

8. The method of claim 1 including:

determining at least one of open position, closed position, action time, action velocity, and action acceleration of the operating mechanism from said motion with respect to time of said selected one of said driven parts.

9. The method of claim 1 including:

employing a spring crank as said selected one of said driven parts; and monitoring motion with respect to time of the spring crank to determine the speed of discharge of the charged spring.

10. The method of claim 9 including:

operating separable contacts with said operating mechanism; and evaluating motion with respect to time of the separable contacts from said motion with respect to time of said spring crank.

11. The method of claim 9 including:

operating separable contacts with said operating mechanism; and determining open and closed positions of the separable contacts from said motion with respect to time of said spring crank.

12. The method of claim 1 including:

employing a closing cam as said selected one of said driven parts; and monitoring motion with respect to time of the closing cam to determine the speed of discharge of the charged spring.

13. The method of claim 1 including:

employing an eccentric surface on said selected one of said driven parts;

following the eccentric surface with a wheel;

employing said wheel to monitor angular movement of said selected one of said driven parts; and adjusting said potentiometer with said wheel.

14. An apparatus for testing a spring powered switch operated by an operating mechanism including a driven part having a variable angular position and actuated by release of a charged spring, said apparatus comprising:

a potentiometer having an input and a rotary shaft;

means for energizing the input of said potentiometer;

means for engaging said driven part to adjust the rotary shaft of said potentiometer and produce a variable output signal thereof, said output signal corresponding to said variable angular movement of said driven part; and means for monitoring said output signal with respect to time in order to monitor said angular movement of said driven part with respect to time.

15. The apparatus of claim 14 wherein said means for monitoring said output signal includes:

means for energizing said potentiometer with a voltage to produce a variable output voltage as the output signal;

analog to digital converter means for converting said output voltage to a plurality of digital values with respect to time; and processor means for monitoring said digital values with respect to time.

16. The apparatus of claim 15 wherein said processor means includes:

means for storing said digital values with respect to time; and means for determining said angular movement of said driven part with respect to time from said stored digital values.

17. The apparatus of claim 14 wherein said means for monitoring said output signal includes:

oscilloscope means for monitoring said output signal with respect to time.

18. The apparatus of claim 17 wherein said oscilloscope means includes:

means for outputting said output signal with respect to time.

19. The apparatus of claim 14 wherein said spring powered switch includes a support member adjacent said driven part; wherein said driven part is a spring crank; and wherein said means for engaging said driven part includes:

a wheel having an axle, said wheel being in rotational contact with said spring crank, with the axle of the wheel rotating in response to said variable angular position of said spring crank; and means for rotatably supporting said wheel with respect to said support member.

20. The apparatus of claim 14 wherein said spring powered switch includes a support member adjacent said driven part; wherein said driven part is a closing cam; and wherein said means for engaging said driven part includes:

a wheel having an axle, said wheel being in rotational contact with said closing cam, with the axle of the wheel rotating in response to said variable angular position of said closing cam; and means for rotatably supporting said wheel with respect to said support member.

21. The apparatus of claim 14 wherein said spring powered switch includes a support member adjacent said driven part; wherein said driven part has an eccentric surface; and wherein said means for engaging said driven part includes:

a wheel having an axle, said wheel being in rotational contact with the eccentric surface of said driven part; and means for rotatably supporting said wheel with respect to said support member and for following the eccentric surface with said wheel, with the axle of said wheel rotating in response to said variable angular position of said driven part.

22. A spring powered switch comprising:

separable contacts having an open position and a closed position;

means for operating said separable contacts between the open and closed positions, said means for operating including a driven part having a plurality of variable angular positions and a closing spring for actuating said means for operating to move said driven part between said angular positions; and a test assembly comprising:

a potentiometer having an input and a rotary shaft;

a voltage source connected to the input of said potentiometer;

means for engaging said driven part, said means for engaging having a linkage which rotates in response to said angular positions of said driven part, said linkage engaging the rotary shaft of said potentiometer to adjust said potentiometer and produce a variable output voltage, said output voltage corresponding to said angular movement of said driven part; and means for monitoring said output voltage with respect to time in order to monitor said angular movement of said driven part with respect to time.

23. The spring powered switch of claim 22 wherein said driven part has an eccentric surface; and wherein said means for engaging said driven part includes means for following the eccentric surface.

* * * * *